United States Patent [19]
Wolfe et al.

[11] Patent Number: 5,243,874
[45] Date of Patent: Sep. 14, 1993

[54] METHOD AND APPARATUS FOR TELESCOPICALLY ASSEMBLING A PAIR OF ELONGATED MEMBERS

[75] Inventors: Robert A. Wolfe; Lester G. Finney, both of Rochester, Pa.

[73] Assignee: Pittsburgh Tubular Shafting, Inc., Rochester, Pa.

[21] Appl. No.: 840,104

[22] Filed: Feb. 24, 1992

[51] Int. Cl.$^5$ ............................................. B62D 1/18
[52] U.S. Cl. ..................................... 74/493; 280/775
[58] Field of Search ........................... 74/493; 280/775

[56] References Cited

U.S. PATENT DOCUMENTS

| | | | |
|---|---|---|---|
| 2,508,832 | 5/1950 | McAninch | 287/1 |
| 2,725,692 | 12/1955 | Andreae | 51/170 |
| 3,386,309 | 6/1968 | Reed et al. | 280/775 X |
| 3,393,533 | 7/1968 | Wilkinson | 64/1 |
| 4,600,222 | 7/1986 | Appling | 285/158 |
| 4,633,732 | 1/1987 | Nishikawa et al. | 74/493 |
| 4,667,530 | 5/1987 | Mettler et al. | 74/493 |
| 4,807,351 | 2/1989 | Berg et al. | 29/432 |
| 4,962,944 | 10/1990 | Reiche et al. | 280/775 |
| 4,977,793 | 12/1990 | Husted | 74/567 |
| 4,991,458 | 2/1991 | Stuedemann | 74/493 X |
| 5,025,679 | 6/1991 | Yamamoto | 74/493 |
| 5,086,661 | 2/1992 | Hancock | 74/493 |

FOREIGN PATENT DOCUMENTS

| | | | |
|---|---|---|---|
| 446428 | 9/1991 | European Pat. Off. | 74/493 |
| 5163 | of 1897 | United Kingdom | 403/359 |

*Primary Examiner*—Leslie A. Braun
*Assistant Examiner*—David E. Henn
*Attorney, Agent, or Firm*—Stanley J. Price, Jr.

[57] ABSTRACT

A pair of telescoping members include interconnecting end portions having a preselected configuration that facilitates the insertion of one tubular end portion into the other tubular end portion. The surface configuration of the interconnecting end portions is complementary so that the surfaces on an inner member engage the surfaces on the outer member to permit the transmission of rotation from one telescoping member to the other while permitting relative longitudinal movement therebetween. The inner and outer connecting members are spaced apart to form an annulus therebetween and provide a degree of tolerance greater than the tolerance provided with conventionally machined telescoping connecting end portions. The tolerance is taken up by the injection of a thermosetting resinous material at an elevated temperature into the annulus, completely filling the annulus. The thermosetting material when reduced to a lower operating or ambient temperature shrinks a preselected degree to form an elastomeric sleeve adhered to the inner surface of the outer connecting member. The cross-sectional area of the elastomeric sleeve is less than the cross-sectional area of the annulus between the connecting members. The difference in the cross-sectional area provides the connection of the telescoping members with a tolerance that is equal to the amount of shrinkage of the elastomeric sleeve. Thus, the provision of the elastomeric sleeve permits precise control of the tolerance between the telescoping members.

20 Claims, 2 Drawing Sheets

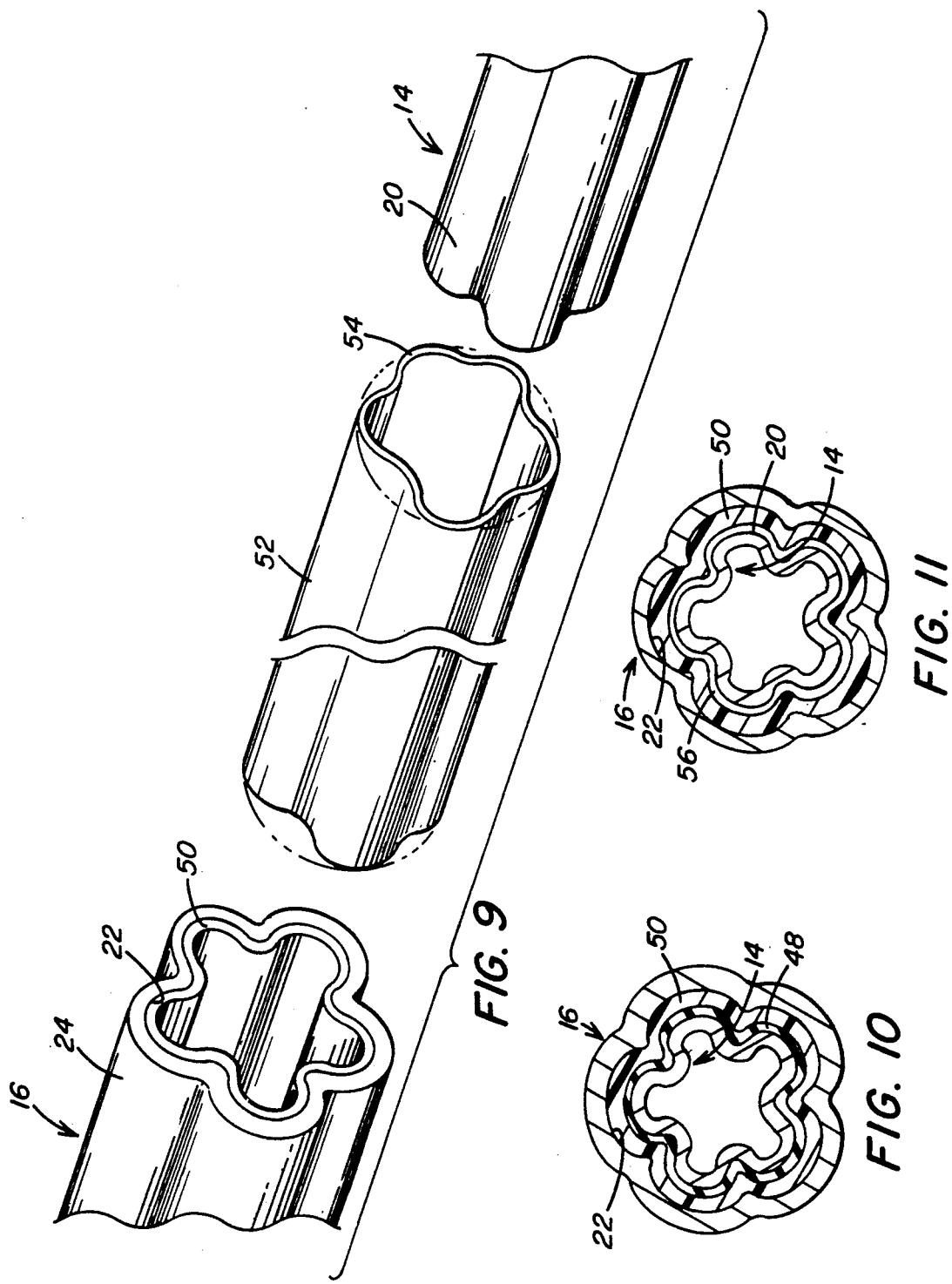

METHOD AND APPARATUS FOR TELESCOPICALLY ASSEMBLING A PAIR OF ELONGATED MEMBERS

BACKGROUND OF THE INVENTION

1. Field Of The Invention

This invention relates to method and apparatus for nonrotatably connecting a pair of telescopically assembled elongated members and more particularly to a method for slidably connecting telescoping members having a preselected degree of tolerance in the nonrotational connection of the telescopic members substantially free of backlash.

2. Description of the Prior Art

In steering devices of motor vehicles it is known to connect the steering wheel to the axle or steerable members of the vehicle by a shaft or steering tube assembly that includes a pair of tubular, concentrically positioned elongated members that are nonrotatably connected to one another. The members are movable longitudinally relative to each other to facilitate assembly and disassembly of the portion connected to the steering wheel to the portion connected to the axle. The elongated members include interfitting connecting end portions where one end portion fits within the other for the transmission of torque from the steering wheel portion to the portion connected to the axle or under carriage of the vehicle. With this arrangement, the interconnecting members are drivingly connected and slide longitudinally relative to each other for assembly and disassembly, as well as, to provide relative movement between the members in response to the forces tansmitted to the lower member by movement of the vehicle over the road surface, as when the vehicle is traveling on a rough or undulatory road surface.

To facilitate the longitudinally slidable, nonrotatable connection of the telescoping members, the contour of the exterior surface of the inner connecting member is complementary with the contour of the inner surface of the outer connecting member. The shape of the contour for facilitating the nonrotatable connection must exhibit a close tolerance fit to minimize backlash in the transmission of torque from one member to the other. The contour of the inner connecting members is selective, for example the shapes may be square, hexagonal, octagonal, three leaf clover design, four leaf clover design, etc. Regardless of the shape of the interconnecting end portions, the chosen contour includes surfaces that are engagable for transmission of torque.

U.S. Pat. No. 4,667,530 illustrates the cross-sectional configuration of the interconnecting end portions of a vehicle steering shaft that includes rounded corners where the shape of the outer shaft approximately matches the shape of the inner shaft. The inner dimensions of the outer member and the outer dimensions of the inner member are different so that considerable play exists between the two parts. The gap that is formed between the two parts is bridged by a sleeve fabricated of suitable plastic material having a low coefficient of friction. The peripheral contour of the sleeve matches the contour of the member on which it is carried. The sleeve has a wall thickness which is dimensioned such that it bridges the gap between the two members so as to reduce the play therebetween. While the sleeve fills the gap between the two members, the sleeve is not stressed in the radial direction and the interconnected members remain longitudinally movable relative to each other.

One of the difficulties encountered in fabricating interconnecting rotation transmission members that must also slip longitudinally relative to each other is machining the interconnecting end portions so as to provide a very close tolerance fit that allows only a minimum amount of backlash. While the interconnecting parts may be machined, each machined part is subject to deviation to a slight extent from the specifications due to variations in the thickness of the tube wall, roundness, lubrication of surfaces, and temperature resulting in differential expansion and contraction of the interfitting end portions. The machining operations that are utilized to take into account the various factors which affect the tolerance between the interconnecting members add substantially to the manufacturing expense of the telescoping assembly.

In order to avoid rotational slippage in the transmission of torque for the nonrotatable connection of telescoping members a number of solutions have been proposed to obtain the effects of a very close tolerance fit. British Patent No. 5163 discloses in a cycle frame the connection of a pair of tubular members in which the corrugated end of a tube is inserted into a socket end of another member having a corrugated configuration that mates with the corrugated configuration of the tube. To obtain a secure joint, the tube and socket are coated with tin in a liquid state at an elevated temperature. When cooled to ambient temperature, the metal hardens to adhesively connect the two members. However, the members are not longitudinally movable relative to each other.

British Patent No. 10180 discloses a similar arrangement in which a cylindrical member is inserted within a star-shaped member where the gap or clearance between the two interfitting members is taken up by a bushing having an inner surface conforming to the outer surface of the inner member and an outer star-shaped surface conforming with the inner contour of the outer member.

U.S. Pat. No. 4,807,351 discloses a method for nonrotatably connecting tubular members of a vehicle drive shaft. In this application, the tolerances between the interfitting members must be so close that there is no slippage upon the application of torque to the connected members. To assure that there is no rotational slippage between the interconnected members, the end portions are joined by a splined connection where the splines are smooth continuous undulating surfaces which are swaged together by an electromagnetic process. While this arrangement nonrotatably connects the interfitting members, the members are not slidable longitudinally relative to one another.

A splined connection between a compressor shaft and turbine shaft in a gas turbine engine is disclosed in U.S. Pat. No. 3,393,533. The turbine shaft is provided with roughly machined external splines that engage the roughly machined internal splines of the compressor shaft. An annular space is provided between the engaging spines and is filled with a thermosetting synthetic resin material. Upon curing, the resin material permits torque to be transmitted from one shaft to the other while the annular space between the splined connection is filled with the resin material. Upon curing of the resin material, the shafts are not movable longitudinally relative to one another. In order to disassemble the shafts, the resin filler material must be sheared.

U.S. Pat. No. 4,977,793 discloses for use in an automotive engine application, the nonrotatable connection of a star-shaped cam element to a cam shaft. The cam shaft has an external configuration complementary to the internal star-shaped configuration of the cam element. An annulus is provided between the opposing contoured surfaces. A flowable plastic material is injected into the annular space. Upon hardening, the plastic material shrinks to interlock the shaft to the cam elements. The resin is chosen to withstand the torque between the cam elements and shaft.

U.S. Pat. Nos. 2,508,832; 2,725,692; and 4,600,222 are further examples of devices for interconnecting telescopic members for a rotation transmission having very close tolerances at substantially reduced rotational slippage or backlash.

While it has been suggested by the prior art devices to nonrotatably connect telescoping members for rotation transmission, it is extremely difficult and expensive to obtain close tolerances in a metal to metal fit. Also in a metal to metal fit for steering tube assemblies, the forces applied by one member to the other member are transmitted to the steering wheel which presents to the driver a coarse or rough feel when the vehicle travels a rough road surface as opposed to a more desirable cushioned feel. As an alternative, roughly machined interconnecting parts are connected using a filler material such as a rubber sleeve or high temperature thermoplastic material. It is also known to utilize a nylon coating on an inner connecting member which may then be machined more economically than a metal to metal fit to engage the inner surface of the outer connecting member in a very close tolerance. However, this also requires machining tasks which add to the time and expense of manufacturing the telescoping members.

It is also known to use filler materials, such as rubber gaskets and thermoplastic material injected at high temperatures to fill the annular space formed between roughly machined interconnecting parts However, the filler materials while providing for a very close tolerance fit which prevent slippage in the transmission of torque do not permit the interconnected members to move longitudinally relative to one another without shearing the filler material from the members. Therefore, there is need in a telescoping arrangement of interconnecting members for apparatus that facilitates efficient assembly of the connecting members with a very close tolerance fit that minimizes backlash while permitting the members to slide longitudinally relative to one another for assembly and disassembly.

SUMMARY OF THE INVENTION

In accordance with the present invention there is provided a telescoping assembly of elongated members that includes an elongated first member having a tubular end portion with an internal surface forming a cavity. The internal surface has a contour of a preselected configuration. An elongated second member has a tubular end portion with an external surface having a contour of a configuration complementary to the preselected configuration of the first member internal surface. The second member end portion is telescopically positioned within the cavity of the first member end portion to nonrotatably connect the internal and external surfaces for longitudinal movement of the first and second members with respect to each other. The second member external surface is spaced from the first member internal surface forming an annulus of a preselected cross-sectional area between the telescopically positioned tubular end portions. A thermosetting resinous material is injected at an elevated temperature into the annulus to initially fill the annulus and upon curing shrink to form a sleeve having a cross-sectional area less than the cross-sectional area of the annulus so that a tolerance in the engagement of the first and second members is formed by the amount of shrinkage of the thermosetting resinous material.

Further in accordance with the present invention, there is provided a method for telescopically and nonrotatably connecting a pair of elongated members that includes the steps of positioning a tubular end portion of an elongated inner member oppositely of a tubular end portion of an elongated outer member. The end portion of the inner member is inserted into the end portion of the outer member. The inner member is concentrically positioned within the outer member for relative longitudinal and nonrotational movement. The inner and outer members are maintained in concentric spaced relation to form an annulus of a preselected cross-sectional area between the inner and outer members. The annulus is filled with a thermosetting resinous material at an elevated temperature. Upon curing the thermosetting resinous material shrinks to form a sleeve having a cross-sectional area less than the cross-sectional area of the annulus. The inner member is nonrotatably connected to the outer member with a preselected tolerance as provided by the amount of shrinkage of the thermosetting resinous material.

Additionally, the present invention is directed to a steering tube assembly having a pair of telescoping members with end portions slidably engaged to one another. The end portions have complementary opposed surfaces of a preselected contour for nonrotatably engaging the telescoping members. The complementary opposed surfaces are spaced a preselected distance apart to form a void therebetween. An elastomeric sleeve is formed in the void between the telescoping members complementary opposed surfaces to nonrotatably connect the telescoping members with a minimum amount of relative rotation therebetween. The elastomeric sleeve is radially expandable and contractible between a first position at an elevated temperature substantially filling the void and a second position at an ambient temperature where the sleeve shrinks in size to occupy a portion of the void to obtain a desired tolerance in the engagement of the telescoping members.

Accordingly, a principal object of the present invention is to provide method and apparatus for telescopically connecting a pair of tubular members in a nonrotational relationship where the tolerance between the members is controlled to minimize the backlash in the transmission of rotation from one member to the other.

Another object of the present invention is to provide a steering tube assembly for vehicles and the like where a pair of tubular members are provided with complementary engaging surfaces for transmission of rotation with substantially reduced backlash with a very close tolerance in the engagement of the members.

A further object of the present invention is to provide a method of manufacturing a steering tube assembly for a vehicle by the telescopic assembly of a pair of tubular members where the members are slidable longitudinally relative to one another and nonrotatably connected substantially free of backlash by filling an annulus between the members with an elastomeric material for a very close tolerance fit that does not require precise machining of the engagable surfaces of the members.

An additional object of the present invention is to telescopically assemble a pair of rotation transmission members in a steering tube assembly where the tolerance between complementary surfaces for transmitting rotation from one member to another is controlled by the injection of a thermosetting resinous material in the gap between the members forming a tolerance fit provided by the degree of shrinkage of the thermosetting resinous material from an injection temperature to an operating or ambient temperature.

These and other objects of the present invention will be more completely disclosed and described in the following specification, accompanying drawings, and appended claims.

BRIEF DESCRIPTION OF THE DRAWINGS

FIG. 9 is a fragmentary exploded isometric view of the steering tube assembly of the present invention, illustrating the use of a rubber sleeve on the inner tubular member to form a gap to provide an increased tolerance between the interfitting end portions.

FIG. 10 is a sectional view in side elevation of the assembled interfitting tubular end portions, illustrating the rubber sleeve positioned on the inner tubular member with the layer of thermosetting resinous material formed between the rubber sleeve and the outer tubular member.

FIG. 11 is a sectional view similar to FIG. 10 of the completed assembly of the interfitting tubular members, illustrating the rubber sleeve removed to provide an increased tolerance by the provision of a gap between the inner tubular member and the layer of thermosetting resinous material within the outer tubular member.

DESCRIPTION OF THE PREFERRED EMBODIMENTS

Figure 1:
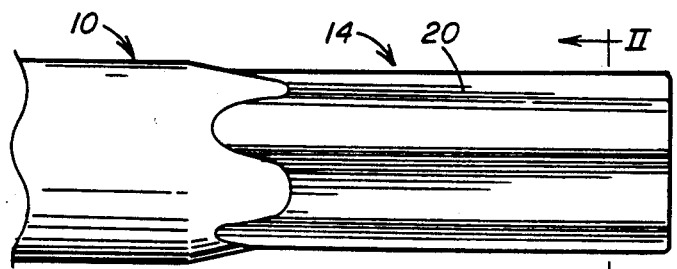
FIG. 1 is a fragmentary view in side elevation of an inner tubular member of a steering tube assembly of the present invention, illustrating a connecting end portion of the member having a preselected peripheral contour.
Figure 2:
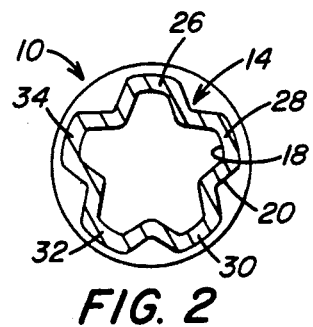
FIG. 2 is a sectional view in side elevation of the connecting end portion of the inner tubular member taken along line II—II of FIG. 1, illustrating the peripheral contour of the tubular member end portion.
Figure 3:
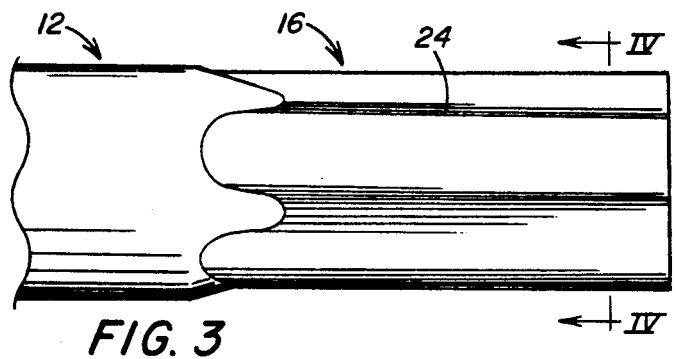
FIG. 3 is a fragmentary view in side elevation of an outer tubular member of the steering tube assembly, illustrating a connecting end portion having a peripheral contour complementary with the contour of the inner tubular end portion shown in FIG. 1.
Figure 6:
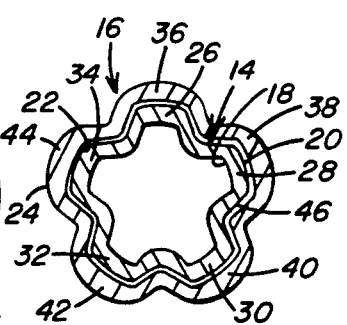
FIG. 6 is a sectional view in side elevation of the end portions of the telescopically assembled tubular members, illustrating the annulus formed between the complementary surfaces of the interfitting end portions.

Referring to the drawings and particularly to FIGS. 1-8, there is illustrated a telescoping assembly of a pair of elongated tubular members generally designated by the numerals 10 and 12 respectively as illustrated in FIGS. 1 and 3. The tubular member 10 serves as an inner tubular member that is received within tubular member 12 that serves as an outer tubular member in the telescoping assembly as shown in FIG. 6. As will be explained later in greater detail, the tubular members 10 and 12 interfit to provide a nonrotatable connection in which the tubular members 10 and 12 remain longitudinally movable relative to each other with a minimum amount of clearance or tolerance between the interfitting portions of the tubular members.

The present invention is particularly adaptable in the manufacture and assembly of a steering tube in a steering device for a motor vehicle, such as a truck. However, it should be understood that the present invention is adaptable for use in any apparatus requiring a nonrotational connection of telescoping members which remain longitudinally movable relative to each other. The present invention is readily adaptable for forming a splined connection for transmitting rotation from a drive shaft to a driven shaft. It is also applicable also in the formation of a glide bushing having a low coefficient of friction without the aid of grease. Overall, the present invention provides a very close tolerance fit between the interfitting end portions of a telescoping assembly so that the occurrence of backlash in the transmission of rotation from one member to another is substantially reduced.

Figure 4:
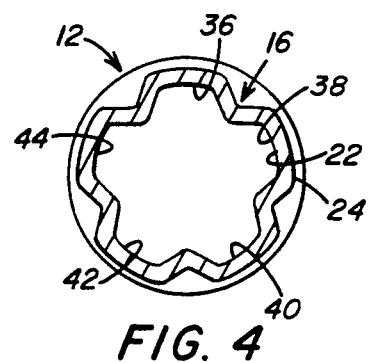
FIG. 4 is a sectional view in side elevation of the connecting end portion of the outer tubular member taken along line IV—IV of FIG. 3, illustrating the peripheral contour complementary with the contour of the inner tubular end portion shown in 2.
Figure 5:
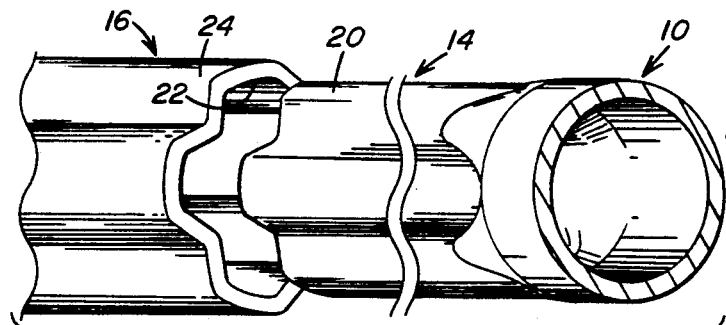
FIG. 5 is a fragmentary exploded isometric view of the tubular members shown in FIGS. 1 and 3, illustrating the members concentrically positioned for insertion of the inner tubular member into the outer tubular member.

The tubular members 10 and 12 shown in FIGS. 1 and 3 have a preselected length and a generally circular cross-section. The members 10 and 12 may be solid shafts rather than tubular. In accordance with the present invention, the members 10 and 12 include connecting end portions generally designated by the numerals 14 and 16 respectively. Each of the end portions 14 and 16, as illustrated in FIGS. 2 and 4, has a contour of a preselected complementary configuration formed by an inner surface 18 and an outer surface 20 for the tubular end portion 14 and an inner surface 22 and an outer surface 24 for the tubular end portion 16. With this arrangement, the connecting end portion 14 extends into the connecting end portion 16 to nonrotatably connect the tubular members 10 and 12 for longitudinal movement relative to each other in a telescoping assembly as illustrated in FIG. 6.

The shape of the connecting end portions of a steering tube assembly is selective. Commonly employed shapes are square, hexagonal, octagonal, three leaf clover, four leaf clover and like designs. In one example, the shape or design of the connecting end portions 14 and 16 of the telescopic assembly of steering tubes for the present invention includes a five leaf clover design. With this configuration as seen in FIG. 2, the inner end portion 14 includes a plurality of arcuate surfaces forming projections or teeth 26-34 on the outer surface 20. Similarly, the outer tubular connecting end portion 16 shown in FIG. 4 includes a plurality of arcuate surfaces forming recesses 36-44 on the inner surface 22, also in a five leaf clover design. The teeth 26-34 on inner connecting end portion 14 are complementary in shape with the recesses 36-44 respectively on the outer connecting end portion 16. Thus, as shown in FIG. 6 when the inner connecting end portion 14 of the tubular member 10 is inserted within the outer connecting end portion 16 of the tubular member 12, the set of teeth 26-34 engage the set of recesses 36-44 to form mating surfaces that nonrotatably connect the end portions 14 and 16 while permitting relative longitudinal movement therebetween.

In accordance with the present invention, it should be understood that the configuration of the respective connecting end portions 14 and 16 is selective. While the present invention is particularly adaptable for connecting end portions 14 and 16 having complex shapes, such as a five leaf clover design, it is also readily adaptable to less complex shapes, such as a square or hex. Regardless of the configuration, the outer surface 20 of the inner end portion 14 is complementary to the inner surface 22 of the outer end portion 16. While the end portions 14 and 16 are nonrotatably connected, a considerable degree of tolerance is provided between the mating surfaces as illustrated in FIG. 6.

The tolerance that is provided between the interconnected end portions 14 and 16 in accordance with the present invention is greater than ordinarily provided with the connecting end portions of steering tubes fabricated to form a metal to metal fit. Thus, the present invention overcomes the difficulties encountered with machining the interengaging parts of telescoping members to obtain a metal to metal fit. Furthermore, in a steering tube assembly where a metal to metal fit exists between the connecting members, reactive forces are transmitted to the steering wheel. The present invention substantially eliminates or minimizes the reactive forces transmitted to the steering wheel so that the driver experiences a cushioned feel not available with a metal to metal fit. Regardless of the precision employed in forming the respective end portions, extremely accurate tolerances are difficult to obtain from machined parts. The close tolerances are desirable, of course, to minimize or substantially eliminate the backlash that occurs when close tolerances are not obtained.

The manufacturing costs associated with obtaining extremely accurate tolerances are considerable and can make the manufacturing of steering tubes uneconomical. With the present invention, the tubular members 10 and 12 are fabricated with the interconnecting end portions 14 and 16 having a tolerance greater than the tolerance found in a metal to metal fit for steering tubes without the adverse effects of a metal to metal fit. As illustrated in FIG. 6, the outer surface 20 of inner connecting end portion 14 is spaced a considerable distance from the inner surface 22 of the outer connecting end portion 16. The relative spacing between the interconnecting end portions 14 and 16 forms an annulus or gap 46 therebetween as shown in FIG. 6.

The annulus or gap 46 formed between the interconnecting end portions 14 and 16 is uniform in cross-sectional area. In one example, the width of the gap or annulus 46 is 0.015 inch with a degree of variance of plus or minus 0.005 inch for a range between about 0.010 to 0.020 inch. With this degree of tolerance between the inner and outer connecting end portions 14 and 16, the tubular members 10 and 12 can be fabricated much more economically than if the end portions 14 and 16 were machined to extremely accurate tolerances, particularly for the end portions 14 and 16 having complex shapes. By providing the interconnecting end portions 14 and 16 with a considerable initial tolerance the end portions 14 and 16 are manufactured from random parts at substantially a lower cost than required to obtain a close tolerance fit for low backlash in a metal to metal fit of telescoping members.

Figure 8:
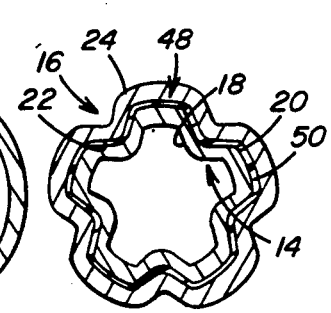
FIG. 8 is a sectional view of the interfitting end portions of the assembled inner and outer tubular members shown in FIG. 7, illustrating the layer of thermosetting resinous material for taking up the tolerance between the interfitting end portions.

The annulus 46 formed between the interconnecting end portions 14 and 16 has a preselected cross-sectional area which is substantially taken up by the addition thereto of a moldable, expandable and contractible filler material generally designated by the numeral 48 in FIGS. 8. In one example of the present invention, the filler material 48 is an elastomeric material, preferably a thermosetting polyurethane elastomer, which is pressure injected into or vacuum formed in the annulus 46 between the inner and outer connecting end portions 14 and 16. The elastomeric material may be selected from a wide variety of injectable or moldable thermosetting compounds. Other examples of thermosetting compounds which may be used with the present invention include epoxies, acrylics, cast polyesters, and the like. Preferably the plastic material that is injected into the annulus 46 has the desired characteristics of low coefficient of friction, good abrasion wear, moderately high temperature performance, and overall good compressive strength.

To facilitate the bonding of the elastomeric material 48 to the inner surface 22 of the tubular connecting end portion 16, the inner surface 22 is chemically treated to accept the elastomeric material that is injected into the annulus 46. In addition, in order to lower the coefficient of sliding friction additives to the thermosetting material are utilized. Examples of additives to the basic elastomeric material may be selected from the group consisting of surface modified ultra high molecular weight polyethylene, graphite, silicone, and molybdenum disulfide. These additives are used to lower the coefficient of sliding friction. Also by pretreating the inner surface 22 of the outer connecting end portion 16 the thermosetting material will permanently adhere to the inner surface 22 but not to the outer surface 20 of the inner connecting end portion 14. With the end portions 14 and 16 in assembled relation as shown in FIG. 6, the elastomeric material is injected into the annulus 46.

Sufficient elastomeric material 48 is injected into the annulus 46 to extend a preselected length on the inner surface 22 of the outer connecting end portion 16. The length along the inner surface 22 to which the elastomeric material extends may vary in length, for example, from 4 inches to 12 inches. Thus, the elastomeric material 48 is injected into the annulus 46 and upon curing substantially, permanently adheres to the inner surface 22 of the outer connecting end portion 16 but does not adhere to the outer surface 20 of the inner connecting end portion 14. With this arrangement, the tubular members 10 and 12 are operable for assembly and disassembly at the interconnecting end portions 14 and 16.

Figure 7:
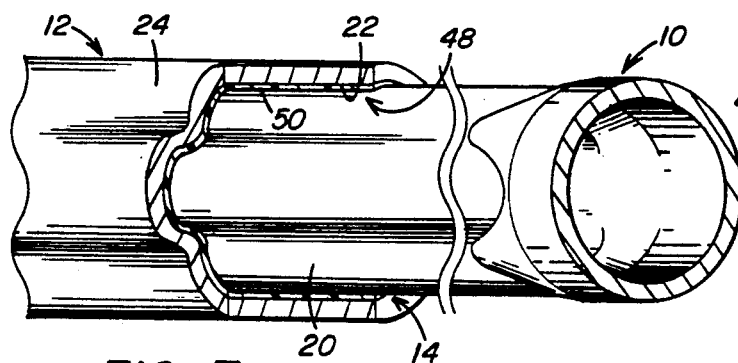
FIG. 7 is a fragmentary isometric view, partially in section, of the assembled inner and outer tubular members, illustrating a layer of thermosetting resinous material positioned in the annulus shown in FIG. 6 between the complementary surfaces of the interfitting end portions.

The elastomeric material forming the filler material 48 between the interconnecting end portions 14 and 16 is injected into the annulus 46 at an elevated temperature. A typical injection temperature is in the range of 200° F. The elastomeric material is injected into the annulus 46 and completely fills the void between the opposing complementary surfaces 20 and 22 of end portions 14 and 16 respectively. In filling the annulus 46 the elastomeric material 48 "takes up" the tolerance initially provided between the end portions 14 and 16 to form an absolute fit between the opposed surfaces 20 and 22. After curing and post mold curing of the elastomeric material 48 and subsequent cooling to ambient temperature, the thermosetting material cures and shrinks to form an elastomeric sleeve 50 as illustrated in FIG. 7. Thus, the elastomeric sleeve 50 is cast in place to form a mated assembly of end portions 14 and 16 where the end portions are longitudinally movable.

The cross-sectional area of the sleeve 50 has an area less than the cross-sectional area of the annulus 46 between the end portions 14 and 16, as illustrated in FIG. 6. The degree of shrinkage of the elastomeric material to form the resultant sleeve 50 at an operating temperature or ambient temperature is minimally controllably based on the material composition of the sleeve 50 and processing temperature.

The degree to which the layer 48 of filler material shrinks to form the elastomeric sleeve 50 provides the desired tolerance between the interconnecting end portions 14 and 16. The tolerance provided in this manner is much closer and more economically produced than a metal to metal fit of the inner connecting end portions 14 and 16. The factors that contribute to tolerance deviations in a conventional metal to metal fit, such as variations in the thickness of the tubular wall, the roundness of the tubular members, lubrication and other factors, are eliminated by forming the telescoping assembly of the present invention from random production of the inner and outer end portions 14 and 16 and the molded elastomeric sleeve 50. Consequently, the associated expense of manufacturing is substantially reduced because these factors are not required to be addressed in order to obtain a close tolerance fit of end portions 14 and 16.

Now referring to FIGS. 9-11, there is illustrated a further embodiment of the present invention for fabricating a telescoping arrangement of tubular members where the operating temperatures for the telescoping assembly are higher than room or ambient temperature. The elements illustrated in FIGS. 9- 11 are designated by like parts for the corresponding elements shown in FIGS. 1-8. Prior to inserting the connecting end portion 14 of the inner tubular member 10 into the connecting end portion 16 of the outer tubular member 12, a flexible sleeve 52 is inserted on the end portion 14. Preferably the sleeve 52 is fabricated of a suitable material that readily flexes to expand and contract to rigidly conform to the configuration of the connecting end portion 14 and securely grip the end portion 14. Accordingly, the sleeve 52 may be fabricated of natural and synthetic rubber and latex or any other material having equivalent characteristics to expand and contract into secure engagement with the connecting end portion 14.

The sleeve 52 is constructed having a preselected thickness 54 as shown in FIG. 9 to provide a desired clearance 56 between the outer surface 20 of connecting end portion 14 and the inner surface of plastic sleeve 50 adhered to the inner surface 22 of the outer connecting end portion 16, as will be explained later in greater detail.

The sleeve 52 is advanced onto the outer surface 20 of interconnecting end portion 14 and conforms to the contour of the end portion 14. Thereafter the end portion 14 with the sleeve 52 thereon is advanced into the outer connecting end portion 16. At this stage in the assembly of the telescoping end portions 14 and 16, it is important to note that the sleeve 50 of elastomeric material has yet to be molded on the inner surface 22 of the outer connecting end portion 16. The connecting end portion 14 with the sleeve 52 thereon is inserted in the connecting end portion 16, and a gap or void is formed between the outer surface of the sleeve 52 on connecting end portion 14 and the inner surface 22 of the outer connecting end portion 16. Once the members 14 and 16 are assembled in this configuration, the elastomeric material 48, as above described, is injected into the gap between the outer connecting end portion 16 and the sleeve 52 on connecting end portion 14. The elastomeric material 48 is added until this gap is filled as shown in FIG. 10.

Following the injection process shown in FIG. 10, and after curing and post mold curing of the elastomeric material 43, the material is allowed to cool to ambient temperature to form the elastomeric sleeve 50 as shown in FIG. 11. The elastomeric material 48 forming the sleeve 50 does not adhere to the rubber sleeve 52 on the inner connecting end portion 14. The inner end portion 14 with the sleeve 52 thereon is then removed from the outer end portion 16 with the elastomeric sleeve 50 formed therein. Once the respective end portions are removed from connection, the sleeve 52 is removed from the end portion 14. This step is illustrated in FIG. 9 showing the sleeve 52 removed from inner connecting end portion 14 with the molded elastomeric sleeve 50 retained within the outer connecting end portion 16.

Once the rubber sleeve 52 is removed from the end portion 14, the end portion 14 is inserted back into the connecting end portion 16 having the elastomeric sleeve 50 therein. Due to shrinkage of the sleeve 50 when reduced in temperature from the injection stage to room or ambient temperature and the absence of the rubber sleeve 52 on the connecting end portion 14, a gap or clearance 56, shown in FIG. 11, is formed between the outer surface 20 of the inner end portion 14 and the sleeve 50 within the outer end portion 16.

The presence of the gap 56 provides the interconnecting members 14 and 16 with additional tolerance for use of the assembled telescoping members at elevated temperatures up to about 300° F. when the elastomeric sleeve 50 expands. Thus, the gap 56 allows for expansion of the elastomeric sleeve 50 at elevated temperatures. The degree of expansion of the sleeve 50 is determined in part by the composition of the material forming the sleeve 50 and the elevated operating temperature of the assembled telescoping members. Thus, the gap or void 56 equal in thickness to the thickness of the rubber sleeve 52 provides additional tolerance for the fit of the interconnecting members 14 and 16 for use of the telescoping assembly at elevated temperatures of up to 300° F, while providing a very close tolerance fit.

The present invention allows tolerances between the connecting members to be controlled when the assembly is used at one temperature level, such as ambient temperature, and then used at an elevated operating temperature, such as 200° F. With the present invention, the expenses associated with precise machining to obtain close tolerance fits are avoided. The provision of the expandable and contractible elastomeric sleeve 50 and the additional clearance provided by the gap 56, as above-described, provide a closer degree of tolerance than available with machine fit telescoping members. The present invention also provides the added advantage of being able to control the tolerance fit when the operating temperature increases.

According to the provisions of the patent statutes, we have explained the principle, preferred construction, and mode of operation of our invention and have illustrated and described what we now consider to represent its best embodiments. However, it should be understood that, within the scope of the appended claims, the invention may be practiced otherwise than as specifically illustrated and described herein.

We claim:

1. A telescoping assembly of elongated members comprising, an elongated first member having a tubular end portion with an internal surface forming a cavity, said internal surface having a contour of a preselected configuration, an elongated second member having a tubular end portion with an external surface having a contour of a configuration complementary to said preselected configuration of said first member internal surface, said second member end portion telescopically positioned within said cavity of said first member end portion to nonrotatably connect said internal and external surfaces for longitudinal movement of said first and second members with respect to each other, said second member external surface spaced from said first member internal surface forming opposing surfaces with an annulus of a preselected cross-sectional area between said telescopically positioned tubular end portions, a thermosetting resinous material injected at an elevated temperature into said annulus to initially completely fill said annulus and contact said opposing surfaces, said thermosetting resinous material responding to a reduction in the elevated temperature to a reduced temperature by cooling to form a cured sleeve cast in place by the configuration of said opposing surfaces, said cured sleeve being formed in place between said first and second members to include an outer surface complementary in configuration with said first member internal surface and an inner surface complementary in configuration with said second member external surface, said sleeve outer surface bonded to said first member internal surface and said sleeve inner surface being radially spaced from said second member external surface for telescopic, slidable movement of said second member relative to said first member with said sleeve retained fixed within said first member, and said cured sleeve having a cross-sectional area less than the cross-sectional area of said annulus and complementary in configuration with said opposing surfaces to provide a uniform tolerance in the telescopical, nonrotational engagement of said tubular end portions controlled by the amount of shrinkage of said thermosetting resinous material.

2. Apparatus as set forth in claim 1 in which, said first member has a contour formed by a plurality of arcuate surfaces forming recesses on said internal surface, said second member has a contour formed by a plurality of arcuate surfaces forming projections on said external surface, and said projections extend into said recesses to form complementary surfaces in contact with said sleeve therebetween for drivingly connecting said first and second members and permit relative longitudinal movement between said first and second members.

3. Apparatus as set forth in claim 2 in which, said annulus between said telescopically positioned tubular end portions creates a tolerance between said complementary surfaces in the range between about 0.010 and 0.020 inch.

4. Apparatus as set forth in claim 2 in which, said annulus is positioned between said complementary surfaces and is filled by the injection of said thermosetting resinous material at an elevated temperature to form an elastomeric sleeve in said annulus and take-up the tolerance between said tubular end portions, said internal surface of said first member is pretreated to accept said thermosetting resinous material to form a bond therebetween so that said sleeve adheres to said first member, and said external surface of said second member being removed from contact with said sleeve for relative longitudinal movement therebetween.

5. Apparatus as set forth in claim 4 in which, said elastomeric sleeve has dimensions responsive to the operating temperature of said tubular end portions such that upon a decrease in temperature from an elevated temperature said elastomeric sleeve shrinks to provide between said complementary surfaces a preselected tolerance fit between said complementary surfaces where the cross section area of said sleeve after shrinkage is less than the cross-sectional area of said annulus prior to the injection of said thermosetting resinous material.

6. Apparatus as set forth in claim 1 in which, said first member internal surface and said second member external surface have complementary configurations in the shape of a five leaf clover.

7. Apparatus as set forth in claim 1 in which, said sleeve is molded in place within said annulus at an elevated temperature to completely fill the cross sectional area of said annulus, and said sleeve having a cross sectional area reduced from the cross sectional area of said annulus to form a preselected tolerance between said tubular end portions at an operating temperature thereof.

8. Apparatus as set forth in claim 7 in which, said sleeve shrinks from an initial cross-sectional area to said reduced cross-sectional area in response to a reduction in temperature from an elevated temperature of said tubular end portions so that the difference between said initial cross-sectional area and said reduced cross-sectional are forms the tolerance between said tubular end portions.

9. Apparatus as set forth in claim 1 in which, said thermosetting resinous material is polyurethane.

10. Apparatus as set forth in claim 1 which includes, means for increasing the tolerance in the engagement of said tubular end portions.

11. Apparatus as set forth in claim 10 in which, said means for increasing the tolerance includes a removable sleeve positioned on said second member external surface and occupying a portion of said annulus, said thermosetting resinous material being injected into said annulus to fill said annulus between said removable sleeve on said second member external surface and said first member internal surface, and said second member being withdrawn from said first member to permit removable of said removable sleeve from said external surface such that upon reinsertion of said second member into said first member a gap is formed between said sleeve formed of thermosetting resinous material positioned within said first member and said second member external surface.

12. Apparatus as set forth in claim 11 in which, said gap provides an area between said thermosetting resinous material sleeve and said second member external surface for increased tolerance to permit expansion of said thermosetting resinous material sleeve into said gap for use of said telescopically positioned tubular end portions at an elevated temperature.

13. Apparatus as set forth in claim 12 in which, the degree of tolerance between said telescopically positioned tubular end portions is dependent on the operating temperature thereof and is variable through a range of operating temperatures as said thermosetting resinous material sleeve expands and contracts.

14. A method for telescopically and nonrotatably connecting a pair of elongated members comprising the steps of, positioning a tubular end portion of an elongated inner member oppositely of a tubular end portion of an elongated outer member, inserting the end portion of the inner member into the end portion of the outer member, concentrically positioning the inner member within the outer member for relative longitudinal and nonrotational movement, maintaining the inner and outer members in concentric spaced relation to form opposing surfaces with an annulus of a preselected cross-sectional area between the inner and outer members, filling the annulus with a thermosetting resinous material at an elevated temperature, reducing the temperature of the thermosetting resinous material in the annulus to shrink the material to form between the inner and outer members a cured sleeve having a configuration complementary with the configuration of the opposing surfaces of the inner and outer members and a cross-sectional area less than the cross-sectional area of the annulus as determined by the degree of shrinkage of the thermosetting resinous material, bonding the sleeve to the outer member with the inner member being movable longitudinally within the sleeve and outer member by radially spacing an external surface of the inner member from an inner surface of said sleeve, and nonrotatably engaging the inner member to the outer member with a preselected tolerance as provided by the amount of shrinkage of the thermosetting resinous material.

15. A method as set forth in claim 14 which includes, reducing the temperature of the thermosetting resinous material from an initial elevated temperature to a lower temperature to cure the thermosetting resinous material to form the sleeve, reducing the size of the sleeve in the annulus by shrinkage of the sleeve in response to the reduction in temperature, and forming the tolerance in the fit of the inner member in the outer member by shrinkage of the sleeve.

16. A method as set forth in claim 15 which includes, controlling the tolerance in the fit of the inner member to the outer member by reducing the temperature of the thermosetting material to a preselected temperature.

17. A method as set forth in claim 14 which includes, positioning a removable sleeve on the inner member to occupy a portion of the annulus between the inner and outer members prior to the addition of the thermosetting resinous material to the annulus, injecting the thermosetting resinous material into the annulus with the removable sleeve on the inner member, curing the thermosetting resinous material to form an elastomeric sleeve in the annulus between the outer member and the removable sleeve on the inner member, removing the inner member with the removable sleeve thereon from the outer member, removing the removable sleeve from the inner member, reinserting the inner member absent the removable sleeve back into the outer member, and forming a gap between the inner member and the elastomeric sleeve attached to the outer member to provide a tolerance between the inner and outer members.

18. A steering tube assembly comprising, a pair of telescoping members having end portions slidably engaged to one another, said end portions having complementary opposed surfaces of a preselected contour for nonrotatably engaging said telescoping members, said complementary opposed surfaces being spaced a preselected distance apart to form a void therebetween, a thermosetting elastomeric sleeve formed in place in the void between said complementary opposed surfaces of said end portions to telescopically and nonrotatably connect said end portions for co-rotation of said telescoping members with a minimum amount of relative rotation therebetween, said elastomeric sleeve having inner and outer surfaces complementary in configuration with said complementary opposed surfaces of said telescoping members, and said elastomeric sleeve being radially expandable and contractible between a first position at an elevated temperature substantially filling said void and a second position at an ambient temperature where the sleeve uniformly shrinks in size to a configuration remaining complementary with said complementary opposed surfaces to occupy a portion of the void to provide a desired tolerance in the engagement of said telescoping members whereby an external surface of an inner telescoping member is radially spaced form an inner surface of said sleeve.

19. A steering tube assembly as set forth in claim 18 in which, said sleeve is composed of a preselected thermosetting resinous material having a coefficient of expansion for obtaining a desired degree of shrinkage of said sleeve to provide the desired tolerance in the engagement of the telescoping members.

20. A steering tube assembly as set forth in claim 18 which includes, means for increasing the spacing between said sleeve in the void and one of said telescoping members to allow for increased expansion of said sleeve to maintain the desired tolerance in the engagement of said telescoping members when exposed to an elevated temperature.

* * * * *